United States Patent [19]

Stolz

[11] Patent Number: 4,537,349
[45] Date of Patent: Aug. 27, 1985

[54] MOTOR VEHICLE WITH AN INTERNAL-COMBUSTION ENGINE AND WITH MEANS FOR HEATING A PAYLOAD SPACE

[75] Inventor: Albert Stolz, Tübingen, Fed. Rep. of Germany

[73] Assignee: Daimler-Benz Aktiengesellschaft, Stuttgart, Fed. Rep. of Germany

[21] Appl. No.: 628,213

[22] Filed: Jul. 5, 1984

[30] Foreign Application Priority Data

Jul. 5, 1983 [DE] Fed. Rep. of Germany ....... 3324138

[51] Int. Cl.³ .............................................. B60H 1/02
[52] U.S. Cl. .................................. 237/12.3 C; 237/45; 237/46; 237/33; 123/142.5 R
[58] Field of Search ...................... 237/12.3 A, 12.3 C, 237/45, 46, 33; 123/142.5 R; 98/2, 2.05

[56] References Cited

U.S. PATENT DOCUMENTS 2,101,627 12/1937 Nallinger ........................ 237/12.3 A
2,158,741 5/1939 Christman ..................... 237/12.3 A

FOREIGN PATENT DOCUMENTS 371658 3/1923 Fed. Rep. of Germany ..... 237/12.3
           Fed. Rep. of Germany ... 237/12.3 A
676736 1/1936 Fed. Rep. of Germany .

Primary Examiner—Henry Bennett
Attorney, Agent, or Firm—Barnes & Thornburg

[57] ABSTRACT

The invention relates to a motor vehicle with an internal-combustion engine, with a heatable payload space and with a pipe flowed by air and leading into the atmosphere, which is divided into two pipe branches. A first heat exchanger flowed by the waste gases of the internal combustion engine is arranged in one of these pipe branches, while a second heat exchanger is arranged in the pipe downstream of the conjunction of the two pipe branches. The latter heat exchanger is flowed on the secondary side by a liquid serving to cool the internal-combustion engine, so that waste gas heat can be transmitted to this liquid, or cooling heat can be discharged to the exterior, as a function of heat incidence and heat demand. In certain embodiments, two heat exchangers are arranged in series in the pipe leading to the atmosphere, one operatively interposed in the engine cooling water circuit, the other operatively interposed in the engine cooling oil circuit.

14 Claims, 5 Drawing Figures

MOTOR VEHICLE WITH AN INTERNAL-COMBUSTION ENGINE AND WITH MEANS FOR HEATING A PAYLOAD SPACE

BACKGROUND AND SUMMARY OF THE INVENTION

The invention relates to motor vehicle heating systems and more particularly to heating systems that more efficiently utilize the heat from the various fluids and gases used with internal combustion engines.

An object of the present invention is to provide an efficient system that is capable of removing or supplying heat from the internal combustion engine while employing the smallest possible number of parts and while facilitating multiple utilization of those parts.

This object is achieved according to the invention by providing an arrangement or system for heating the payload space, including a pipe leading into the atmosphere through which air is transportable, the pipe being divided into a first pipe branch and a second pipe branch, of which one branch pipe is provided with a first heat exchanger through which waste gases of the internal-combustion engine are flowed on one side of the exchanger. The arrangement also includes a second heat exchanger arranged downstream of the junction of the two pipe branches and a control device for dividing the air between the first and second pipe branches, the second heat exchanger having a liquid for cooling the internal-combustion engine flowed on one side of the exchanger.

In the system of the present invention a multiple utilization of the existing parts is possible. In the system, the air, in the case of high heat incidence and/or low heat demand, absorbs heat in the second heat exchanger from the liquid utilized for cooling the internal-combustion engine and discharges it outwards. In the case of low heat incidence and/or high heat demand, the air is heated by the waste gases and returns heat to the liquid and hence to the internal-combustion engine, so that the latter can attain its service temperature more rapidly and thus indirectly assist in the heating of the payload space.

In certain preferred embodiments of the present invention the second heat exchanger serves not only as an engine oil cooler, but also returns waste gas heat via the engine oil into the internal-combustion engine.

In certain preferred embodiments of the present invention the second heat exchanger utilizing cooling liquid, alone or in conjunction with a heat exchanger utilizing engine oil, facilitates the cooling of the cooling liquid by surrendering heat to the air flowing through said exchanger, or alternatively it may be used to accelerate the warming-up of the internal-combustion engine and to improve the heating of the payload space by absorbing heat from the air.

With the preferred embodiments of the present invention combustion air is fed at the most favorable temperature via an air intake pipe to the internal-combustion engine thus further improving the thermal economy of the engine.

In certain preferred embodiments of the present invention the system includes means for returning a portion of the air from the pipe leading to the atmosphere from a location downstream of the second heat exchanger back into said pipe at a location upstream of the bifurcation of the pipe into the first and second branches. The partial guidance of air in the pipe as ambient air further improves the thermal economy.

In certain preferred embodiments of the present invention air flowing through the pipe leading to the atmosphere is obtained from the payload space. This has a beneficial effect in that the air in the payload space fed from the pipe leading to the atmosphere is already heated at times of high heat demand and is frequently cooled at times of low heat demand.

In certain preferred embodiments of the present invention the second heat exchange is provided with the filling connection for the cooling liquid and has sufficient volume to allow for the expansion of the cooling liquid when it is heated. By this arrangement separate compensating and expansion tanks for the cooling liquid can be omitted and the number of parts used thereby reduced.

Further objects, features, and advantages of the present invention will become more apparent from the following description when taken with the accompanying drawings which show, for purposes of illustration only, several embodiments in accordance with the present invention.

DETAILED DESCRIPTION OF THE DRAWINGS

Figure 1:
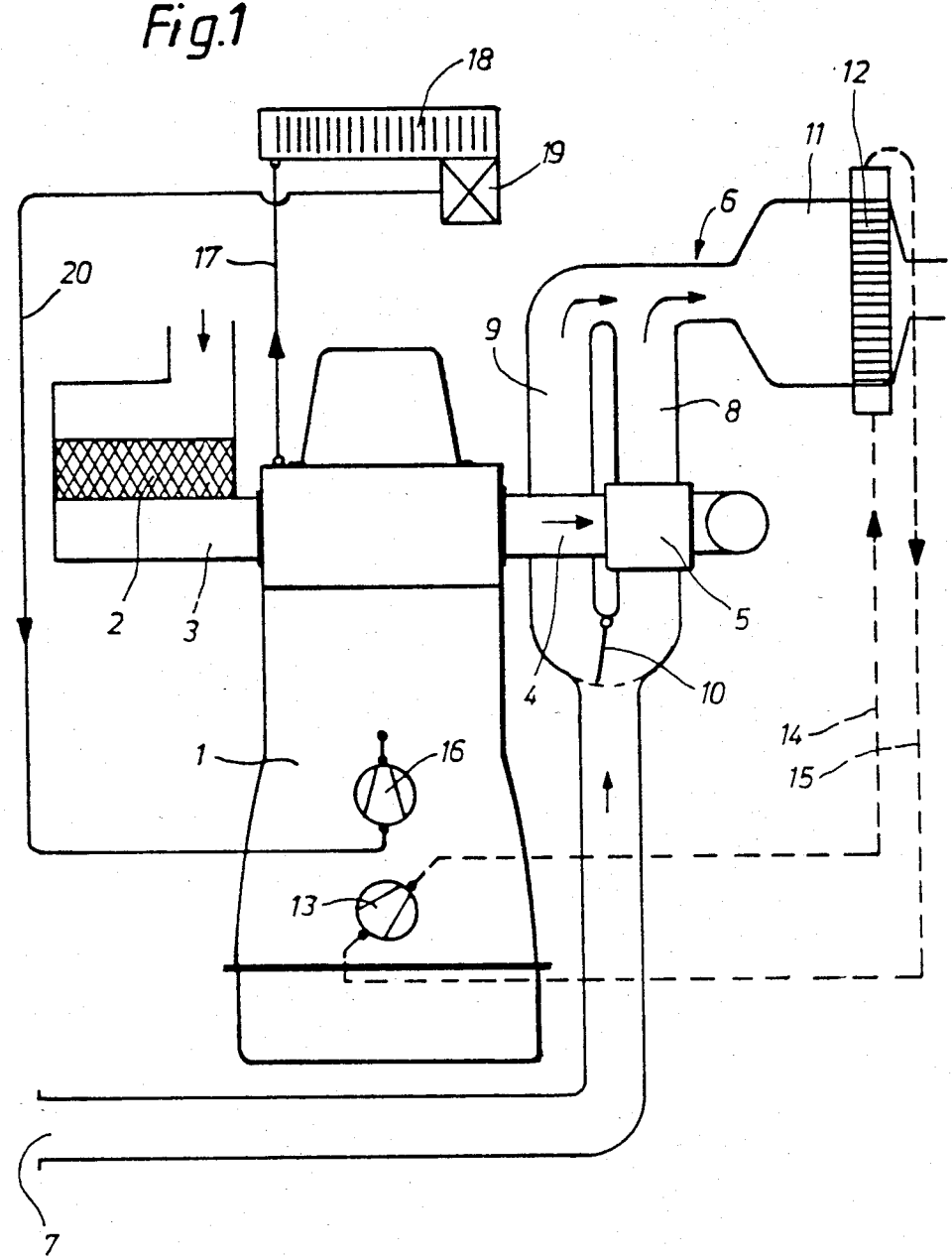
FIG. 1 is a diagrammatic representation of a motor vehicle heating arrangement constructed in accordance with a first preferred embodiment of the present invention.

In the drawings and the following description like reference characters are used to designate similar features of the various illustrated embodiments FIG. 1 shows a motor vehicle with a pipe 6 carrying air heatable by the waste gases of the internal-combustion engine, with a heat exchanger 12 receiving engine oil on the secondary side arranged therein.

The internal-combustion engine 1 used for propelling a motor vehicle is supplied with combustion air through an admission pipe 3 provided with an air filter 2. The waste gases of the internal-combustion engine 1 leave the latter through an outlet pipe 4, in which a first heat exchanger 5 is arranged which is flowed on the one side by the waste gases, whereas it receives air on the other side. This air flows through the pipe 6, the inlet orifice 7 of which is exposed to the stagnation pressure generated by the motor vehicle in motion or to the pressure side of the fan [not shown] of the internal-combustion engine 1. In the region of the heat exchanger 5 the pipe 6 divides into two pipe branches 8 and 9 with a flap 10 at the bifurcation point to divide the air between the two pipe branches 8 and 9. The pipe branch 8 passes through the heat exchanger 5, so that the air flowing through it can absorb heat from the waste gases. The pipe branch 9 by-passes the heat exchanger 5. After the junction of the two pipe branches 8 and 9 the pipe 6 widens. A second heat exchanger 12, which is flowed by engine oil on the secondary side, is arranged in this widened part 11. This engine oil is transported to the heat exchanger 12 and back through pipes 14 and 15 by an oil pump 13 driven by the internal combustion engine 1. Following the widening 11 the pipe 6 leads into the atmosphere. It is thereby ensured that in the event of a possible leak in the first heat exchanger 5, waste gases passing into the air of the pipe 6 cannot reach the interior of the motor vehicle.

A part of a circuit for the cooling water of the internal combustion engine 1 is illustrated. Water is delivered by a water pump 16 driven by the internal combustion engine 1. The cooling water flows from the internal-combustion engine 1 through a pipe 17 into a heating heat exchanger 18, via which heat is surrendered directly or indirectly to the payload space [not shown here] of the motor vehicle. After the cooling water has flowed through a throttle 19 mounted on the heating heat exchanger 18, it flows back through the pipe 20 to the internal-combustion engine 1.

By means of the arrangement described it is possible in a simple manner to reconcile heat incidence and heat demand. If for example the service temperature of the internal-combustion engine 1 has not yet been attained, or if in the case of a low heat incidence in the engine a high heat demand for the payload space of the motor vehicle exists, then the air flowing through the pipe 6 is directed through the pipe branch 8 by means of the flap 10. The heat absorbed there from the waste gases in the heat exchanger 5 is surrendered in the second heat exchanger 12 to the engine oil, so that the service temperature of the internal-combustion engine 1 is attained more rapidly, and/or the heat incidence in the internal-combustion engine 1 is increased in order to cover the heat demand. If on the other hand the heat demand is low for a high heat incidence in the internal-combustion engine, then the air is directed through the pipe branch 9 and serves subsequently as cooling means for the engine oil in the heat exchanger 12, so that it is possible to dispense with a separate engine oil cooler.

Figure 2:
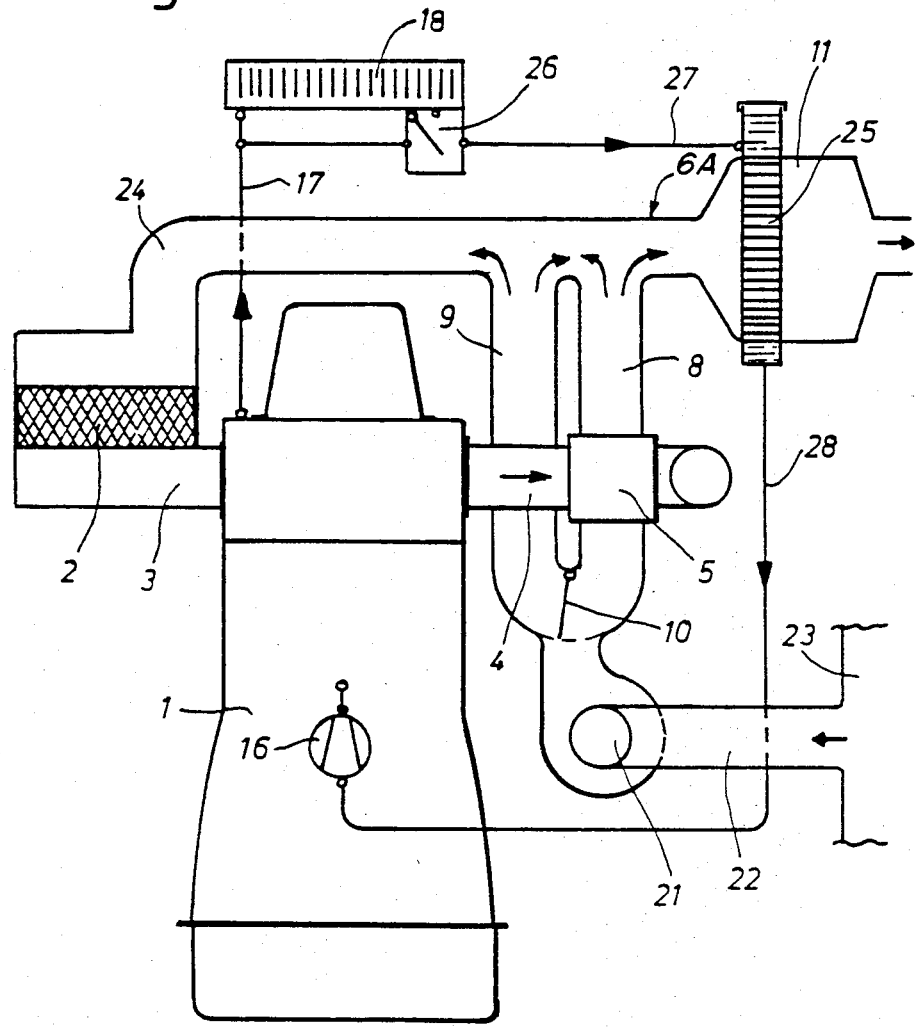
FIG. 2 is a diagrammatic representation of a system in accordance with a second preferred embodiment of the present invention.

FIG. 2 shows another embodiment with pipe 6A corresponding generally to pipe 6 of the FIG. 1 arrangement, with a heat exchanger 12 receiving cooling water from the internal combustion engine 25 on the secondary side arranged therein, and with an air intake pipe 24 for the combustion air of the internal combustion engine branching therefrom.

In this embodiment of FIG. 2 the air is transported through pipe 6A by a blower 21, and is sucked through a pipe 22 from the payload space 23 of the motor vehicle, so that its heat content can be utilized. An air intake pipe 24 for combustion air, which leads into the admission pipe 3, branches from the pipe 6 at the junction of the two pipe branches 8 and 9, so that the internal combustion engine 1 is supplied either with cool combustion air or with combustion air preheated in the heat exchanger 5, according to demand.

Cooling water from the internal-combustion engine 1, is flowed on the secondary side of a heat exchanger 25, which is arranged in the widened part 11 of the pipe 6A. For this purpose the cooling water, transported by the water pump 16, flows from the internal-combustion engine 1 through the pipe 17 via the heating heat exchanger 18 or, controlled by a water switch 26, directly through a pipe 27 to the heat exchanger 25 and through a pipe 28 back to the internal-combustion engine. By this arrangement, either the cooling water can be heated in the heat exchanger 25 and the heat supplied to the cooling water circuit, or the cooling water can be cooled in the heat exchanger 25 and the customary cooling water cooler therefore relieved (or even totally economized), according to heat demand and heat incidence.

Figure 3:
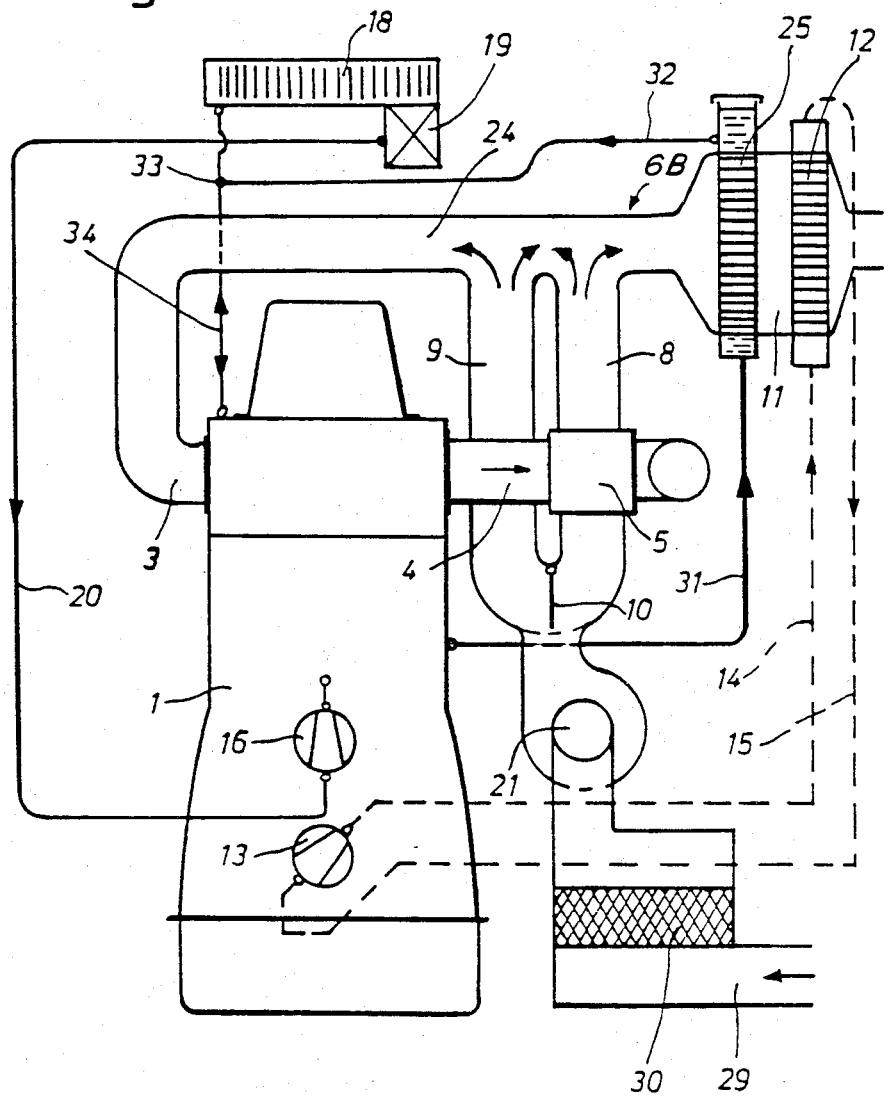
FIG. 3 is another diagrammatic representation of a system in accordance with a third preferred embodiment of the present invention.

FIG. 3 shows another embodiment with a pipe 6B corresponding generally to pipe 6 of the FIG. 1 arrangement, with two heat exchangers 12, 25 receiving engine oil and cooling water arranged therein.

In this embodiment of FIG. 3 blower 21 sucks in air flowing through pipe 6B from the atmosphere through a suction pipe 29 with an air filter 30. The combustion air and the air flowing through the heat exchangers 12 and 25 are therefore purified in common. Due to the arrangement of the two heat exchangers 12 and 25 for the engine oil and the cooling water, the advantages of the two previous examples of construction (FIG. 1 and 2 embodiments) are combined, whereby a particularly rapid reconciliation of heat incidence and heat demand can be achieved. In this case the cooling water is fed from the center of the internal-combustion engine 1 through a pipe 31 to the heat exchanger 25 and passes from there through a pipe 32 to a bifurcation 33, from where it flows back to the internal-combustion engine 1 either directly via a pipe 34 or via the heating heat exchanger 18 and the throttle 19 and the pipe 20. An immediate inflow of cooling water from the internal-combustion engine 1 to the heating heat exchanger 18 via the pipe 34 is also possible.

Figure 4:
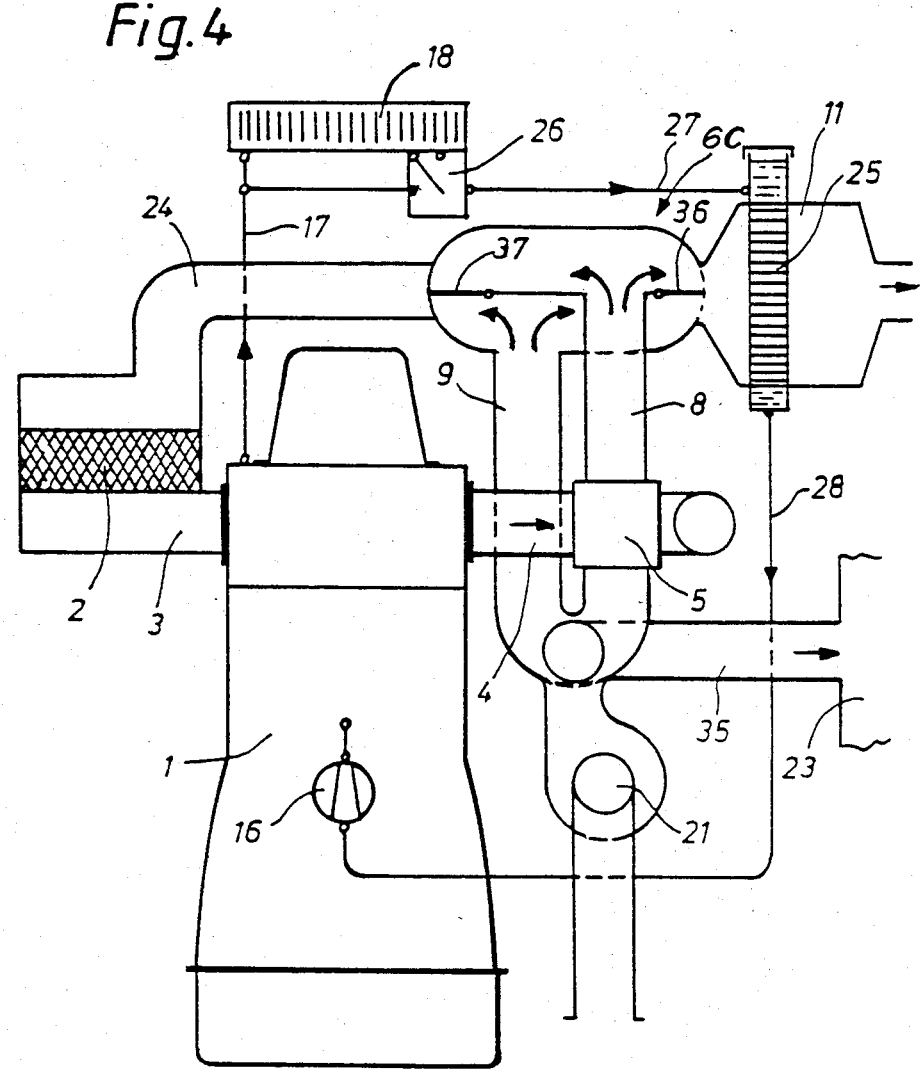
FIG. 4 is another diagrammatic representation of a system in accordance with a fourth preferred embodiment of the present invention.

FIG. 4 shows another embodiment with a pipe 6C corresponding generally to pipe 6 of the FIG. 1 arrangement, with a pipe 35 with means for dividing the air flowing through it into combustion air and into air flowing into the atmosphere.

In this embodiment of FIG. 4, pipe 35 leading to the payload space 23 of the motor vehicle is connected to the bifurcation point of the two pipe branches 8 and 9, so that air sucked in from the atmosphere by blower 21 can also be supplied as fresh air to the payload space 23. Two flaps 36 and 37, which are arranged in the junction of the two pipe branches 8 and 9, control the division of the air between these two pipe branches 8, 9 and thereby influence only indirectly the division between the air intake pipe 24 and that part of the pipe 6 leading into the atmosphere.

Figure 5:
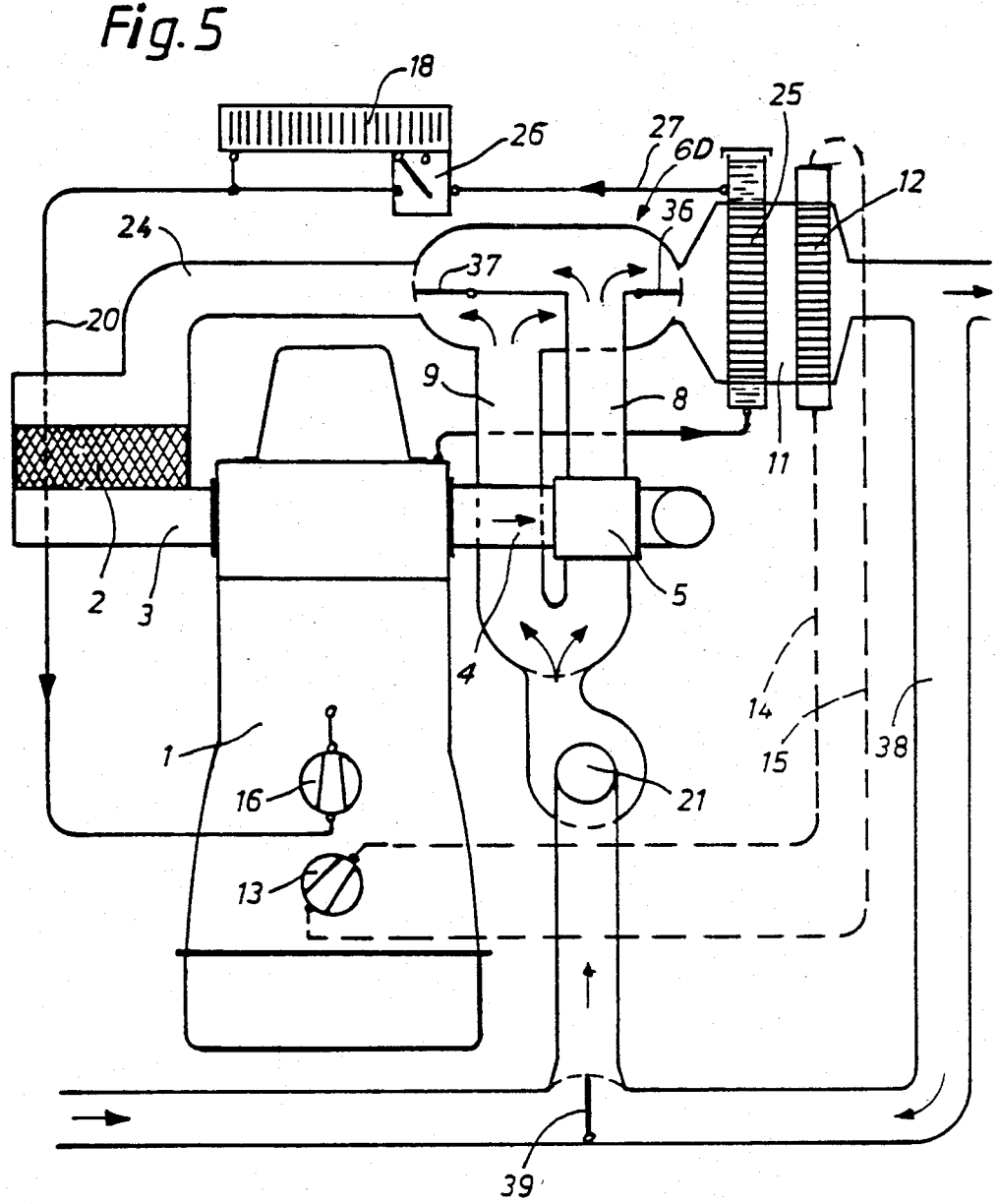
FIG. 5 is another diagrammatic representation of a system in accordance with a fifth preferred embodiment of the present invention.

FIG. 5 shows another embodiment with a pipe 6D corresponding generally to pipe 6 of the FIG. 1 arrangement, with partial air return through pipe 38 of flowing through it.

In the embodiment according to FIG. 5 a part of the air is returned from the pipe 6D downstream of the two heat exchangers 12 and 25 via pipe 38, the quantity of the returned air being controlled via a flap 39 in proportion to the air sucked in through the inlet orifice 7. It is thereby possible to re-utilize a part of the heat content of the air downstream of the heat exchangers 12 and 25.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A heating system for a motor vehicle with an internal-combustion engine, and a payload space, the heating system comprising:

an atmospheric relief pipe leading into the atmosphere through which air is transportable, the atmospheric relief pipe being formed to include at one end an inlet orifice for admitting air from one of the atmosphere and the payload space and at the other end an outlet orifice for discharging air back into the atmosphere, said atmospheric relief pipe being divided into a first pipe branch and a second pipe branch at a junction point;

a first heat exchanger in communication with an exhaust gas of the engine, the first heat exchanger being positioned in said first pipe branch to warm air flowing through the first pipe branch;

second heat exchanger means in communication with a liquid for cooling the engine, the second heat exchanger being positioned in the atmospheric relief pipe at a point downstream of the junction of the two pipe branches so that the air flowing through the atmospheric relief pipe intercepts the second heat exchanger to warm or cool selectively the liquid for cooling the engine;

and air dividing means for dividing the air between the first and second pipe branches.

2. A motor vehicle as claimed in claim 1, wherein the liquid for cooling the engine is engine oil.

3. A motor vehicle as claimed in claim 1, wherein the liquid for cooling the engine is cooling water, said cooling water being flowed through a heating heat exchanger, with said heated water being used to heat the payload space.

4. A motor vehicle as claimed in claim 3, further comprising an air intake pipe, which branches from said atmospheric relief pipe at or downstream of the junction of the two pipe branches.

5. A motor vehicle as claimed in claim 4, wherein the air flowing through the atmospheric relief pipe is communicated from the payload space by payload air line means.

6. A motor vehicle as claimed in claim 5, including means for returning a portion of the air from the atmospheric relief pipe from a location downstream of the second heat exchanger means into said atmospheric relief pipe at a location upstream of the bifurcation of same into the first and second pipe branches.

7. A motor vehicle as claimed in claim 6, wherein the second heat exchanger means contains the required volume for the expansion of a cooling liquid when heated, the second heat exchanger means also including the filling connection for the cooling liquid.

8. A motor vehicle as claimed in claim 3, wherein the secon heat exchanger means includes an auxilary heat exchange located adjacent a primary second heat exchanger, the auxilary heat exchanger having cooling water flowed on one side thereof which has been flowed through the heating heat exchanger, and the primary second heat exchanger having engine cooling oil flowed on one side thereof.

9. A motor vehicle as claimed in claim 8, further comprising an air intake pipe, branching from said atmospheric relief pipe at or .downstream of the junction of the two pipe branches.

10. A motor vehicle as claimed in claim 9, including means for returning a portion of the air from the atmospheric relief pipe from a location downstream of the second heat exchanger means into said atmospheric relief pipe at a location upstream of the bifurcation of the pipe into the first and second pipe branches.

11. A motor vehicle as claimed in claim 10, wherein the auxiliary heat exchanger contains the required volume for the expansion of the cooling water when heated, the exchanger also includes the filling connection for the cooling water.

12. A heating system according to claim 1, wherein said atmospheric relief pipe is open only at said inlet and outlet orifices to ensure that waste gases passing into the relief pipe cannot reach the payload space.

13. A heating system for a motor vehicle having a payload space to be heated, an engine, an exhaust gas system, and an engine cooling system, the heating system comprising:

a heat distribution pipe through which air is conductable, the heat distribution pipe including an upstream portion formed to nclude an inlet orifice for admitting air from one of the atmosphere and the payload space, an intermediate portion having a first and second pipe branch, and a downstream portion formed to include an outlet orifice for discharging air that has been conducted through at least one of the pipe branches back into the atmosphere, first junction means for coupling the upstream portion to an upstream end of each of the pipe branches, second junction means for coupling a downstream end of each of the pipe branches to the downstream portion, exhaust gas heat exchanger means, disposed in the first pipe branch, for exchanging heat between the exhaust gas system and air flowing through the first pipe branch, cooling liquid heat exchanger means, disposed in the downstream portion, for exchanging heat between the engine cooling system and air flowing through the downstream portion, and flap valve means for selectively routing air flowing through the upstream portion to one of the first pipe branch to intercept the exhaust gas heat exchanger means to warm air flowing toward the downstream portion so that the warmed air flow operates to warm the coolant liquid in the engine cooling system via the cooling liquid heat exchanger means and the second pipe branch to bypass the exhaust gas heat exchanger means so that the air flowing through the downstream portion operates to cool the coolant in the engine cooling system via the cooling liquid heat exchanger means, whereby a service temperature of the engine is controlled selectively to raise the temperature of a warming liquid that is conducted through the engine and used to heat the payload space or to lower the service temperature of the engine to cool the engine.

14. A heating system according to claim 13, wherein said atmospheric relief pipe is open only at said inlet and outlet orifices to ensure that waste gases passing into the relief pipe cannot reach the payload space.

* * * * *